United States Patent

Schalkwijk

[15] 3,648,202

[45] Mar. 7, 1972

[54] TRANSMITTING ARRANGEMENT FOR USE IN TONE FREQUENCY PUSHBUTTON SELECTION SYSTEMS

[72] Inventor: Jan Schalkwijk, Hilversum, Netherlands

[73] Assignee: U.S. Philips Corporation, New York, N.Y.

[22] Filed: Mar. 19, 1971

[21] Appl. No.: 126,339

Related U.S. Application Data

[63] Continuation of Ser. No. 511,046, Dec. 2, 1965, abandoned.

[30] Foreign Application Priority Data

Dec. 3, 1964 Netherlands ..........................6414016

[52] U.S. Cl. ....................................334/47, 334/59, 334/60, 331/179, 179/90 K

[51] Int. Cl. ........................................H03j 5/08, H03j 5/32

[58] Field of Search ...............334/47, 60; 331/179; 179/90 K

[56] References Cited

UNITED STATES PATENTS

| | | | |
|---|---|---|---|
| 2,294,178 | 8/1942 | Hanert | 331/179 X |
| 3,060,275 | 10/1962 | Meacham et al. | 179/90 K |
| 3,184,554 | 5/1965 | Meacham et al. | 179/90 K |

FOREIGN PATENTS OR APPLICATIONS

| | | | |
|---|---|---|---|
| 299,955 | 11/1928 | Great Britain | 179/90 K |

*Primary Examiner*—Herman Karl Saalbach
*Assistant Examiner*—Wm. H. Punter
*Attorney*—Frank R. Trifari

[57] ABSTRACT

A transmitting arrangement for use in a tone frequency pushbutton selection system which by the depression of an arbitrary key a single tone frequency is produced by an oscillator coil and capacitor arrangement and depression of any two adjacent keys results in short circuiting a portion of the oscillator coil.

7 Claims, 2 Drawing Figures

| | | |
|---|---|---|
| 1 | 2 | 3 |
| 4 | 5 | 6 |
| 7 | 8 | 9 |
| A | 0 | B |

a

| | | |
|---|---|---|
| 1a | 1c | 3a |
| 1b | 1d | 3b |
| 2c | 2a | 3c |
| 2d | 2b | 3d |

b

INVENTOR.
JAN SCHALKWIJK
BY
Frank R. Trifari
AGENT

TRANSMITTING ARRANGEMENT FOR USE IN TONE FREQUENCY PUSHBUTTON SELECTION SYSTEMS

This application is a continuation of application 511,046, filed Dec. 2, 1965, now abandoned.

The invention relates to a transmitting arrangement for use in a tone frequency pushbutton selection system in which by the depression of an arbitrary key a tone frequency signal of substantially one frequency is produced and which comprises an oscillator coil provided with tappings and a plurality of capacitors which can be connected to the tappings on the oscillator coil by means of pushbutton contacts.

Such arrangements are used in the telephone sets of automatic telephone systems in which the normally used dial has been replaced by a keyboard.

In practice, the selection by means of pushbuttons instead of a dial involves various difficulties which are characteristic of the use of pushbuttons. One of these difficulties consists in that the inaccurate depression of a key may result in that also an adjacent key is depressed. In the aforementioned pushbutton system using single tones, a wrong digit is consequently simulated, as a result of which ultimately a wrong connection is made.

The invention has for its object to provide a transmitting arrangement of the said type in which no digit can be simulated as a result of the depression of two adjacent keys.

The arrangement in accordance with the invention is characterized in that a low-resistance shortcircuit conductor is available which extends along the pushbutton contacts and which can be connected to the tappings on the coil by means of pushbutton contacts, the pushbuttons being arranged so that each of two adjacent pushbuttons is associated with a different coil tapping and that when two adjacent pushbuttons are depressed, the part of the coil located between the tappings is shortcircuited via the shortcircuit conductor.

This transmitting arrangement affords the advantage that when two adjacent keys are depressed during the selection, no undesired connection is made. The subscriber has then to select again in order to establish the desired connection.

The invention will now be described more fully with reference to an embodiment shown in the drawing.

Figures 1, 2:
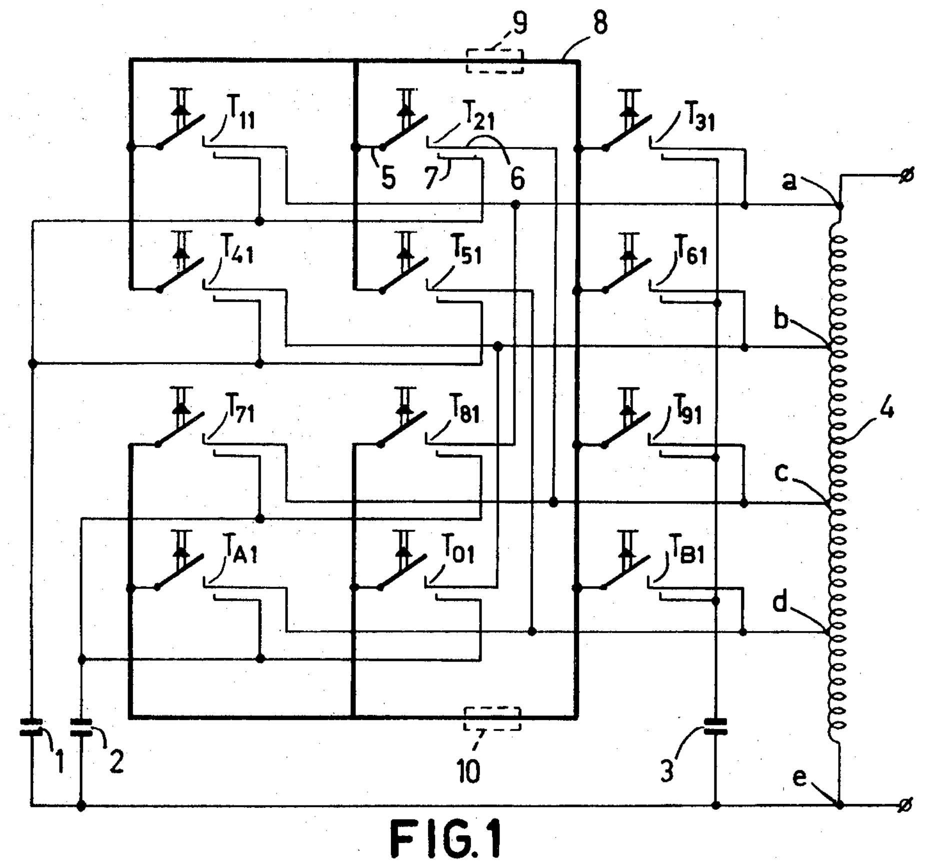
FIG. 1 shows an embodiment of a transmitting arrangement in accordance with the invention.
FIG. 2 shows the disposition of the pushbuttons.

FIG. 1 illustrates the resonant circuit of a tone frequency oscillator for use in a telephone set equipped with pushbuttons $T_1$... $T_0$, TA and TB. In this case, the system concerned is a pushbutton selection system using single tones, i.e., a system in which the depression of an arbitrary key results in that a tone frequency signal of mainly one frequency is produced. The resonant circuit comprises three capacitors 1, 2 and 3 and a coil 4 provided with the tapping points *a*, *b*, *c* and *d*. The tapping point *a* constitutes at the same time one of the two ends of the coil. The other end of the coil, which is designated in the drawing by *e*, is connected with one of the two sides of the capacitors 1, 2 and 3. When a corresponding key is depressed, each of the pushbutton contacts $T_{11}$... $T_{01}$, $TA_1$ and $TB_1$ connects the other side of one of the capacitors 1, 2 and 3 with one of the tapping points *a*, *b*, *c* and *d*. As a result, the concerned capacitor is connected in parallel with the part of the coil located between the concerned tapping point and the point *e*. Twelve different resonant circuits may thus be constituted which each having a different natural frequency. When a key is depressed, the tone frequency oscillator, the frequency-determining element of which is constituted by the resonant circuit shown, generates a signal the frequency of which is determined by the natural frequency of the resonant circuit. This tone frequency signal is transmitted through the subscriber line connected to the subscriber set to a tone receiver which derives from the frequency of the signal the identity of the key which has been depressed.

FIG. 2*a* illustrates the disposition of the pushbuttons $T_1$... $T_0$, TA and TB on the telephone set. The indication T used for a pushbutton has been omitted, since in practice this indication is not found on the keyboard either. FIG. 2*b* presents at the places of the pushbuttons digit-character combinations of which the digit indicates the capacitor and the character indicates the tapping point on the coil which are connected to each other upon the depression of the key concerned. For example, when the key $T_1$ is depressed, the capacitor 1 is connected to tapping point *a*.

As compared with the more complicated systems using multiple tones, the pushbutton selection system shown using single tones has in practice proved to be an efficacious selection system which can be realized with the aid of simple means. A practical difficulty arises, however, in the system using single tones. This difficulty is due to the fact that when two adjacent keys are depressed, which may happen in case of a rapid and careless selection of a number, a tone is produced the frequency of which is close to the normal selection frequencies. The tone receiver cannot distinguish this undesired frequency from the normal selection frequencies, as a result of which the reception of a wrong digit is simulated.

In order to prevent the simulation of a wrong digit, the pushbutton contacts are constructed and connected to each other so that the depression of each pair of adjacent keys results in that at least part of the oscillator coil is shortcircuited. When the oscillator is partly or completely shortcircuited, the tone frequency oscillator cannot generate a signal. In this case, no tone frequency signal is transmitted to the tone receiver. In the tone frequency pushbutton systems using single tones which are utilized in practice, it is usual for each of the tone frequency signals to be accompanied by an additional signal consisting of a line interruption of short duration before or after the tone frequency signal or of a decrease of the line current during the tone frequency signal. This additional signal is normally used to distinguish the tone frequency selection signals from speech signals. The additional signal is produced by the depression of any arbitrary pushbutton. If the tone receiver receives the additional signal without receiving a tone frequency signal, the digits which may already have been received are erased in consequence thereof and a tone signal, for example, busy tone or dialling tone, is supplies to the calling person. Such a measure is already usual in order to prevent a calling person which interrupts the connection for a short time and then starts selecting again should receive a wrong connection. The measure proposed in this application may thus be used without additional measures in the tone receiver being necessary. The suppression of the tone frequency signal in case two adjacent keys are depressed thus prevents a wrong connection from being established.

The pushbutton contacts $T_{11}$... $T_{01}$, $TA_1$ and $TB_1$ take the form of twin make contacts, as shown in FIG. 1. Each twin make contact includes three contact springs 5, 6 and 7, as is shown in FIG. 1 at the pushbutton contact $T_{21}$. Upon the depression of a key, contact spring 5 is urged against contact spring 6 and subsequently these two contact springs are urged against contact spring 7. The contact springs 5 of the twin make contacts are each connected with a short circuit conductor indicated in FIG. 1 with a bold full line 8. The contact springs 6 are connected with the tapping points on the oscillator coil and the contact springs 7 are connected with the capacitors. As is apparent from FIG. 2*b*, the digit-character combinations associated with the pushbuttons are chosen so that each of two adjacent pushbuttons is associated with a different tapping point on the oscillator coil. If at random two adjacent pushbuttons are depressed, at each of the pushbuttons the contact spring 5 is first brought into contact with contact spring 6. As soon as this has happened, a short circuit is produced between the tapping points on the coil which are connected through the short circuit conductor 8 with the contact springs 6. Subsequently, at each pushbutton the contact springs 5 and 6 together are brought into contact with contact spring 7. This cannot result in an oscillation, however, since the short circuit of the coil through the contact springs 5 and 6 associated with the pushbuttons and the short circuit conductor 8 is maintained.

With reference to FIG. 1, it is possible to ascertain in a simple manner that the foregoing applies to each pair of adjacent keys, while it is noted that two keys situated obliquely with respect to one another, such as $T_1$ and $T_5$ or $T_3$ and $T_5$, must be considered as adjacent keys.

The resonant circuit shown is included in an oscillator circuit arrangement in which direct voltages are produced which charge the capacitors 1, 2 and 3. As a result of the depression of two adjacent keys associated with different capacitors, a short circuit is also produced between these capacitors. This may result in undesirable current pulses. In order to limit the amplitude of these current pulses, resistors may be included in the short circuit conductor 8 at the places 9 and 10 indicated with dotted lines. These resistors are chosen so that on the one hand the short circuit is sufficiently effective to prevent oscillations from being produced and that on the other hand the amplitude of the current pulse is reduced to a permissible value.

What is claimed is:

1. In a tone generator of the type comprising a coil having a plurality of taps, a plurality of capacitors, and a plurality of switch means connected to selectively connect said capacitors to said taps, whereby a resonant circuit is formed by the operation of any of said switches, means for short circuiting at least a portion of said coil upon the simultaneous operation of any two adjacently positioned switch means, said means for short circuiting comprising a common conductor connected to each of said switch means, each of said switch means comprising means for interconnecting, upon operation, one of said taps, one of said capacitors, and said common conductor, all adjacently positioned switch means being connected to different taps of said coil.

2. A frequency-selecting circuit for a tone generator of the type comprising a plurality of frequency-selecting switch means, said circuit comprising a plurality of said switch means, coil means having a plurality of taps, a plurality of capacitors, and a common conductor, each of said switch means comprising means for connecting said common conductor to one electrode of one of said capacitors and to one of said taps, adjacent switch means being connected to different taps of said coil whereby simultaneous operation of any pair of adjacent switch means short circuits at least a portion of said coil.

3. The circuit of claim 2, in which the other electrodes of said capacitors are connected to an end of said coil.

4. The circuit of claim 2, in which each of said switch means comprises a switch having a movable contact connected to said common conductor, and first and second make contacts, said first make contact being connected to one of said taps on said coil and said second make contact being connected to said one electrode of one of said capacitor.

5. The circuit of claim 4, in which said switch means are arranged to establish contact between said movable contact and said first make contact before establishing contact to said second make contact.

6. A frequency-selecting circuit for a tone generator comprising a plurality of pushbuttons arranged in a plurality of rows and columns, coil means having a plurality of taps, a plurality of capacitors, separate switch means operated by each of said pushbuttons, and a common short-circuiting conductor, each of said switch means comprising means for interconnecting one electrode of one of said capacitors to one of said taps and to said short-circuiting conductor, switch means operable by adjacent pushbuttons being connected to different taps of said coil means whereby at least a portion of said coil is short circuited when adjacent pushbuttons are simultaneously pushed.

7. The circuit of claim 6, in which the other electrodes of said capacitors are connected to an end of said coil.

* * * * *